Figure 1:
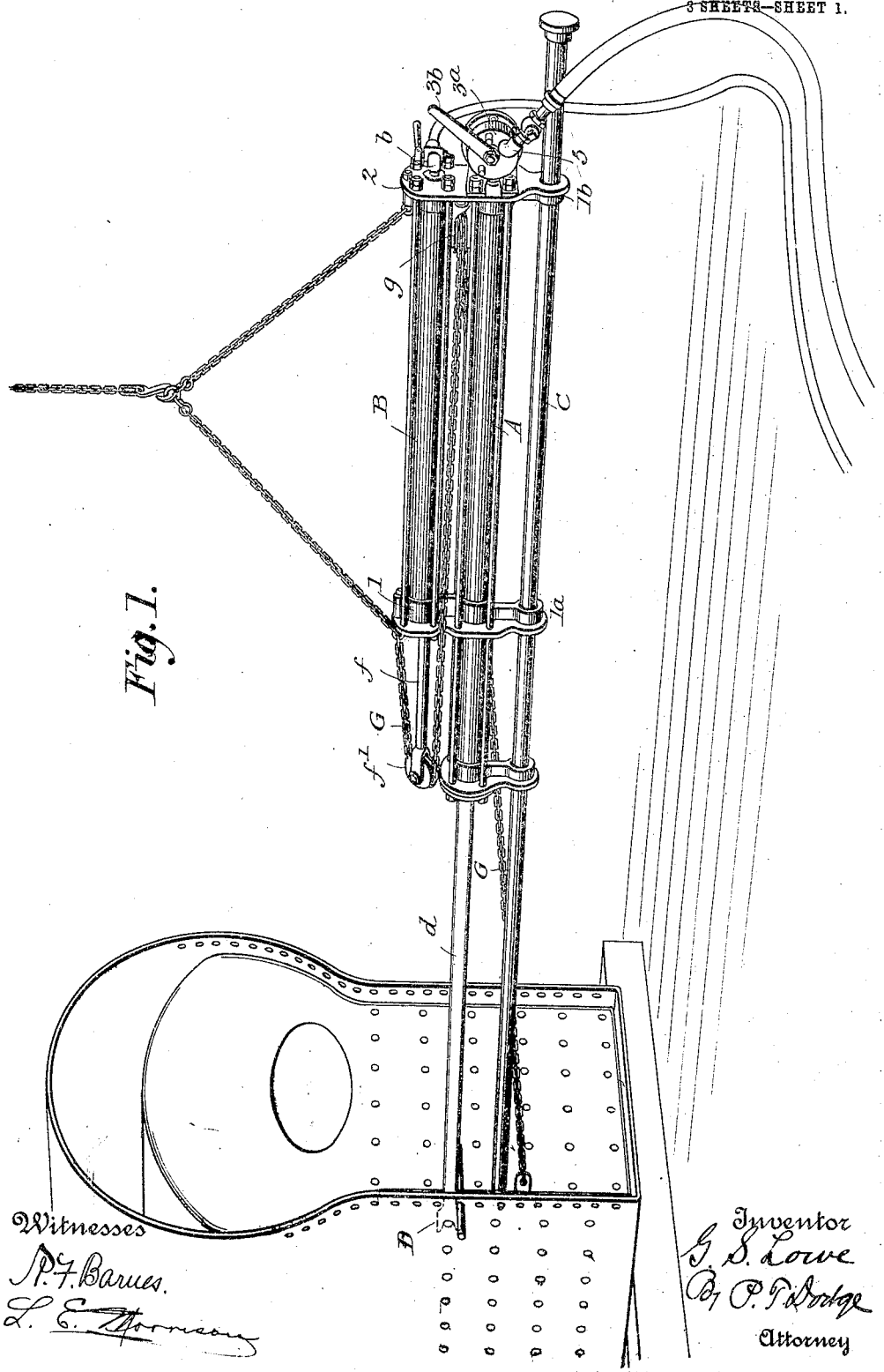

G. S. LOWE.
MACHINE FOR SEVERING STAY BOLTS.
APPLICATION FILED JUNE 17, 1908.

925,491.

Patented June 22, 1909.
3 SHEETS—SHEET 1.

Witnesses
P. F. Barnes.
L. E. Morrison

Inventor
G. S. Lowe
By P. T. Dodge
Attorney

G. S. LOWE.
MACHINE FOR SEVERING STAY BOLTS.
APPLICATION FILED JUNE 17, 1908.

925,491.

Patented June 22, 1909.
3 SHEETS—SHEET 2.

Witnesses
N. F. Barnes.
L. E. Morrison.

Inventor
G. S. Lowe
B. P. T. Dodge
Attorney

G. S. LOWE.
MACHINE FOR SEVERING STAY BOLTS.
APPLICATION FILED JUNE 17, 1908.
925,491.
Patented June 22, 1909.
3 SHEETS—SHEET 3.
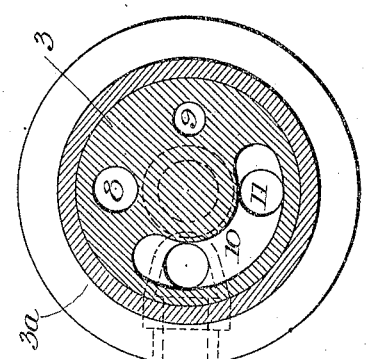
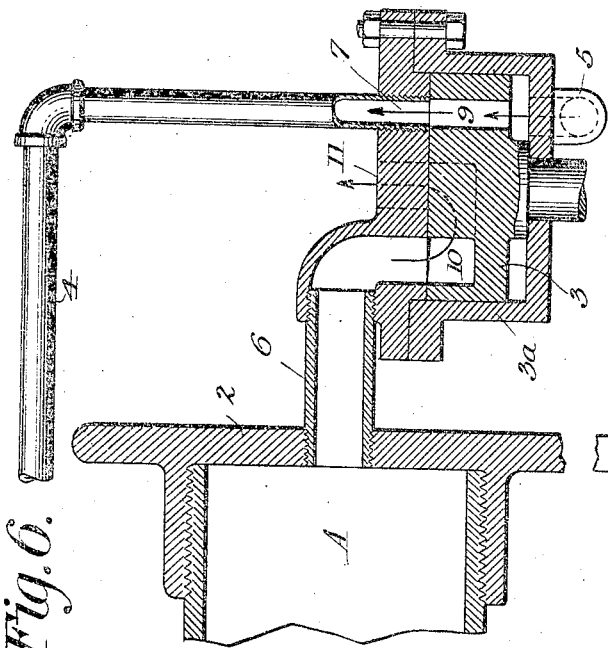
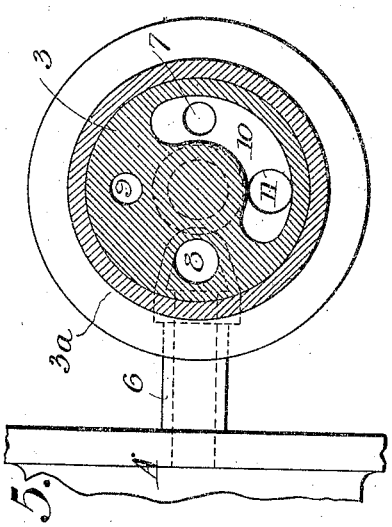
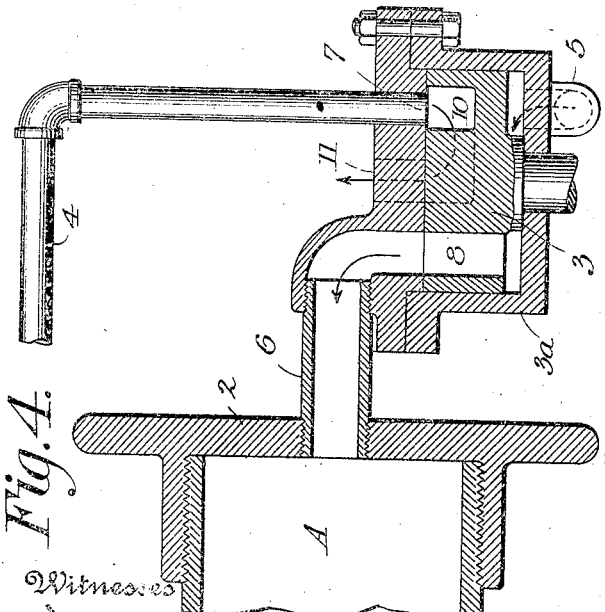
Inventor
G. S. Lowe
By P. T. Dodge
Attorney

UNITED STATES PATENT OFFICE.

GROVER S. LOWE, OF MOLINE, ILLINOIS, ASSIGNOR TO WILLIAMS, WHITE & COMPANY, A CORPORATION OF ILLINOIS.

MACHINE FOR SEVERING STAY-BOLTS.

No. 925,491.　　　Specification of Letters Patent.　　　Patented June 22, 1909.

Application filed June 17, 1908. Serial No. 438,885.

*To all whom it may concern:*

Be it known that I, GROVER S. LOWE, of Moline, county of Rock Island, and State of Illinois, have invented a new and useful Improvement in Machines for Severing Stay-Bolts, of which the following is a specification.

This invention relates to mechanism for severing or cutting stay bolts and the like, which machines are known in the trade as "stay bolt breakers", and the invention is designed more particularly for severing the bolts which connect fire boxes to boilers, the objects of the invention being to provide a device for this purpose which will be strong and durable in construction, powerful and rapid in action, and which is portable so that it may be moved from place to place in the shops and readily applied to the work to be acted on.

With these ends in view, my approved apparatus embodies primarily a cutting member, controllable power means for actuating the same to sever the bolts, and controllable power means for sustaining the cutter in operative relation to the bolts so that the cutter will adjust itself automatically in cutting relation to the successive bolts of a row and will be held in the most effective position relative to the bolts to perform the cutting action.

In its more specific embodiment, the cutter head is carried on the end of a bar projecting into the forward end of a cylinder, in which is mounted, to slide freely back and forth, a piston or ram adapted, when pressure is admitted behind it, to be propelled rapidly forward and strike the end of the rod a forcible blow, by which action the bolt will be severed. Coöperating with this cylinder is a second cylinder rigidly connected with the first whose piston, under constant pressure, acts on a chain or other flexible connection, between the cylinders and the boiler or other work operated on, in such manner that it tends to draw the two cylinders up to the work, thereby maintaining the cutter head in forcible but yielding engagement with the bolt to be severed, and acting when the bolt is cut, to automatically thrust the cutter head forward and engage it with the next bolt.

Figure 2:
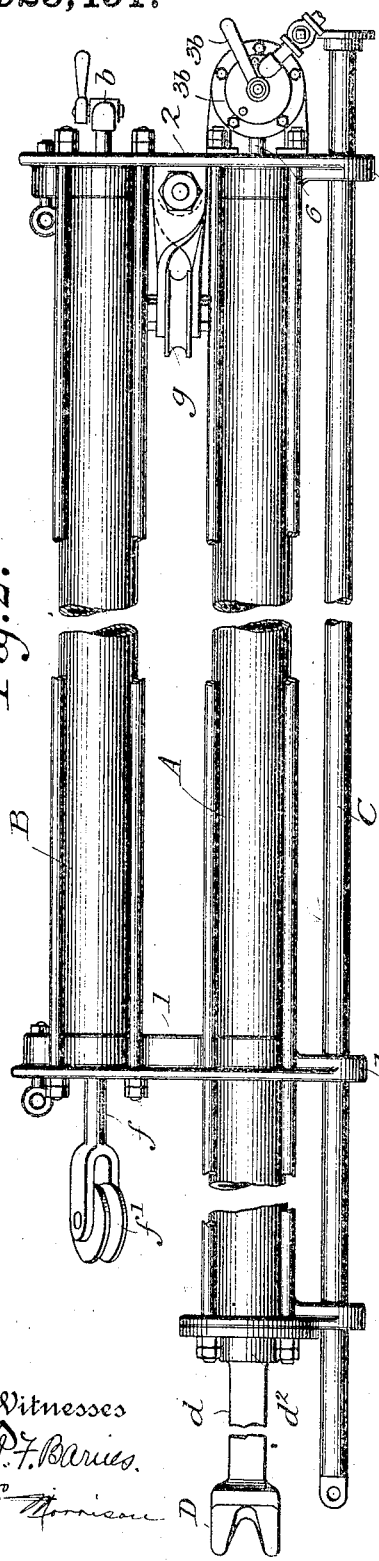
Figure 3:
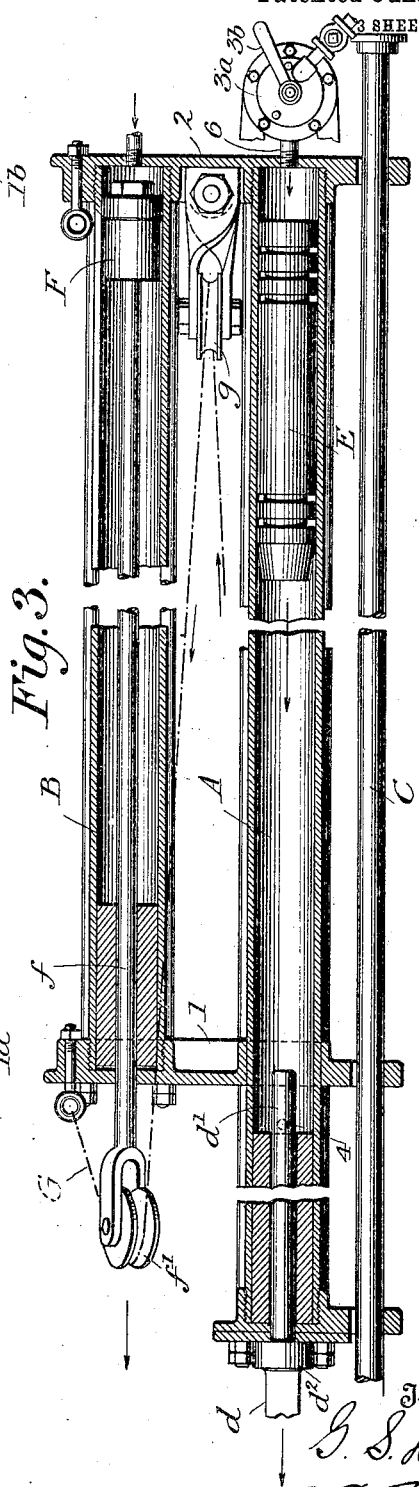

In the accompanying drawings:—Figure 1 is a perspective view of my improved machine, showing the same applied to a locomotive boiler to sever the bolts connecting the fire box. Fig. 2 is a side elevation of the machine on an enlarged scale. Fig. 3 is a longitudinal sectional elevation through the same. Figs. 4 and 5 are diagrammatic views, partly in section, of the controlling valve for the cutter actuating cylinder, showing the valve in one of its different positions. Figs. 6 and 7 are similar to Figs. 4 and 5, showing the valve mechanism in a different position.

Referring to the drawings:—A represents the cylinder which operates the cutter, which for convenience of description I designate the cutter actuating cylinder, and B represents the second cylinder, which for convenience of description I term the pressure cylinder, which cylinders are connected fixedly together, the pressure cylinder above and parallel with the other, by means of a bracket 1 at the front and a bracket 2 at the rear.
The lower ends of these brackets have extensions 1$^a$ and 1$^b$ depending therefrom which contain alining guide openings to receive a guide rod C adapted to be secured temporarily at its forward end to the boiler or other work acted on, and on which guide rod the two connected cylinders are free to slide, for the purpose presently to be described.

D represents the cutter head fixed to the forward end of a rod or stem $d$ extending at its rear end, as at $d'$, a short distance into the forward end of the cutter actuating cylinder and provided outside the cylinder with a shoulder $d^2$ abutting against the front of the cylinder, the said head being formed with a V-notch having cutting edges adapted to straddle the bolt to be cut.

E represents the cutter actuating piston or ram, in the form of a heavy solid cylindrical block sliding freely within the cutter actuating cylinder, and acting, on the admission of pressure into the rear end of said cylinder by means of a controlling valve 3, to be propelled rapidly forward and to strike the end $d'$ of the cutter stem a forcible blow and thereby sever the bolt, the return of the ram for the next stroke being effected by the admission of pressure into the forward end of the cylinder in front of the ram through a pipe 4, as will be presently described.

F represents the piston of the pressure cylinder, whose piston rod $f$ extends through the forward end of the cylinder and carries a pulley $f'$.

G represents a chain connected at one end to the bracket 1, whence it passes over the pulley $f'$ rearwardly and around a pulley $g$ mounted on the bracket 2, and finally forward, its free end being adapted to be fastened to the boiler or other object acted on, so that the pressure in the cylinder acting in rear of the piston will serve to urge it forward and will cause the pulley $f'$ to strain on the chain, with the result that the two cylinders will be pulled forward along the guide rod C, and the end of cylinder A by abutting against the shoulder on the cutter stem will hold the cutter head with its V-notch tightly straddling the bolt to be severed.

As shown in Figs. 4, 5 6 and 7, the valve 3 for controlling the pressure to the cutter actuating cylinder is of cylindrical form and is mounted in a cylindrical casing 3ª supplied with pressure, either air or steam, from any suitable source through pipe 5, entering one side of the casing. The rear end of the cylinder connects with the valve casing by pipe 6, which enters the opposite side of the casing, while the forward end of the cylinder connects with the valve casing by pipe 4, entering through the side of the casing by port 7. The valve proper is formed with a port 8 for the admission of pressure to the rear end of the cylinder, with a port 9 for the admission of pressure to the forward end of the cylinder and with an exhaust port 10, communicating with an exhaust opening 11 in the side of the casing, which ports may by the oscillation of the valve, be so adjusted that in one position, that shown in Fig. 5, pressure will be admitted to the rear end of the cylinder and the forward end opened to the exhaust, whereby the ram will be propelled forward to deliver the cutting blow; and in the other position, that shown in Fig. 7, the rear end of the cylinder will be opened to the exhaust and pressure admitted to the forward end, thereby returning the ram to the rear end of the cylinder for the next stroke.

In the use of the machine, it is preferably suspended by flexible means from some overhead support, as shown in Fig. 1, so that it may be advanced along its guide rod and act on the successive bolts. The forward end of the guide rod C and the free end of chain G are, by suitable means, fastened to the boiler near its front, the cutter head engaged with the bolt to be severed, and the two cylinders drawn up along the guide rod until the forward end of cylinder A abuts against the shoulder on the cutter-bar stem. Pressure is now admitted to cylinder B by a valve $b$ and the valve left open so as to exert a constant pressure on the piston. This will result in forcing the cutter head firmly against the bolt ready to receive the stroke of the ram. Valve 3 is next turned to the position shown in Fig. 6 by shifting its operating handle 3ᵇ to the rear, with the result that the rear end of the cylinder will be opened to exhaust, and pressure admitted through pipe 4 to the forward end in front of the ram, and the latter will by this means be forced back to the rear end of the cylinder. The operating handle 3ᵇ is then thrown forward to the position shown in Fig. 4, which will shift the valve so that its port 8 will register with port 6, and the exhaust port will register with port 9. This will admit pressure to the rear end of the cylinder and the ram will be propelled rapidly forward and strike the end of the cutter bar stem a violent blow, thereby severing the bolt. The obstruction to the advance of the machine, which had been offered by the bolt just severed, being now removed, piston F under constant pressure moves forward some distance, thereby pushing on chain G, pulling the two cylinders forward on their guide bar and causing the cutter to be thrust forward automatically until it comes up against the next bolt in the row, in which position it will be firmly held as before. Valve 3 is now again turned back to return the ram to the rear end of the cylinder, and the operations described are repeated, and in this manner the bolts in the row are severed in quick succession, the machine after each cutting operation being advanced by the pressure in cylinder B, a distance corresponding to that between the bolts, and the cutter head being automatically engaged with the next bolt as the advance of the machine progresses.

In order that the too sudden or forcible return of the ram to the rear end of the cylinder may be prevented so as to avoid a severe back-blow on the cylinder, port 9 in valve 3, through which pressure is admitted to the forward end of the cylinder, is made relatively smaller than port 8 in order to give a relatively slow and easy return of the ram.

It will be observed from the construction described that the pressure cylinder B and its piston, in addition to its function of holding the cutter bar up to the work, acts as a cushion for the violent blow delivered by the ram, the tendency of the machine to rebound from the reaction of the pressure behind the ram, being resisted by the constant pressure in cylinder B on the piston F.

The guiding bar C on which the two cylinders slide, serves as a means for controlling the path of movement in which the cutter head advances from one bolt to the next, and the operator by grasping the rear end of said bar may either cause the cutter head to advance in a truly horizontal line, or it may be directed at an inclination upward or downward by slightly lowering or raising the guide bar, and in this way the cutter head may be adjusted to a nicety in cutting relation to the bolts, whether alined in a row or disposed irregularly.

The form of the valve controlling the pressure to cylinder B is such that the pressure may be cut off and the rear end of the cylinder opened to the exhaust, so that the piston after it is advanced intermittently its full stroke in the operation of severing a number of bolts, may be returned to the rear end of the cylinder to begin a new series of operations.

It will be understood that the details of the mechanism may be variously changed and modified within the skill of a mechanic without departing from the limits of my invention, and provided the operations are substantially as described above, the essence of the invention residing in the coöperation with the cutting mechanism of controllable power means for maintaining the cutter in operative relation to the successive bolts, and for automatically thrusting the cutter forward after one bolt has been severed, so that it will act on the next.

Having thus described my invention, what I claim is:—

1. A machine of the type described including in combination means for positioning the machine for severing a series of bolts, a bolt cutter, and automatic means supported by the machine and operating independently of the actuation of the bolt cutter for progressing the cutter from one bolt to another as they are cut.

2. A machine of the type described including in combination means for positioning the machine for severing a series of bolts, a bolt cutter, automatic means supported by the machine and operating independently of the actuation of the bolt cutter for progressing the cutter from one bolt to another, and means for causing the cutter to cut the bolt.

3. In a machine of the type described means for positioning the machine for severing a series of bolts, a bolt cutter, automatic means supported by the machine and operating independently of the actuation of the bolt cutter for progressing the cutter from one bolt to another, and means controlled by the operator for causing the cutter to cut a bolt.

4. A machine of the type described including in combination a bolt cutter, automatic means supported by the machine and operating thereon and independently of the actuation of the cutter and acting to press the cutter against a bolt, and means for giving a cutting movement to the cutter when so pressed.

5. A machine of the type described including in combination a guide which may be positioned relatively to a series of bolts, a bolt cutter, actuating means therefor, said cutter and actuating means being movable along said guide to cut the bolts in succession.

6. A machine of the type described including in combination a guide which may be positioned relatively to a series of bolts, a bolt cutter, actuating means therefor, said cutter and actuating means being automatically movable along said guide to cut the bolts in succession.

7. A machine of the type described including in combination means for positioning the machine with respect to a series of bolts, a bolt cutter, actuating means therefor, and means supported by the machine and operating independently of the actuation of the bolt cutter for progressing the cutter and its actuating means from bolt to bolt as they are cut away.

8. A machine of the type described including in combination a bolt cutter, automatic means supported by the machine and operating independently of the actuation of the bolt cutter for progressing the cutter from a cut to an uncut bolt and pressing it against the uncut bolt, and means for causing the cutter to cut the bolt.

9. A machine of the type described including in combination a bolt cutter, fluid pressure means operating independently of the actuation of the bolt cutter for progressing the cutter from one bolt to another, and means for causing the cutter to cut the bolt.

10. A machine of the type described including in combination a bolt cutter, automatic fluid pressure means operating independently of the actuation of the bolt cutter for progressing the cutter from one bolt to another, and means for causing the cutter to cut the bolt.

11. A machine of the type described including in combination a cutter, means for imparting a cutting movement thereto, and fluid pressure means for progressing said cutter and said means from point to point along the work.

12. A machine of the type described including in combination a cutter, means for imparting a cutting movement thereto, and means for progressing said cutter and said means from point to point along the work between the cutting movements.

13. A machine of the type described including in combination a bolt cutter, means for positioning the cutter for cutting a series of bolts, means for imparting a cutting movement to the cutter, and automatic means carried by the machine independently of the cutter-actuating means for maintaining the cutter and its actuating means in operative relation as the cutter progresses from bolt to bolt.

14. A machine of the type described including in combination a bolt cutter, means for positioning it for severing a series of bolts, means for imparting a cutting movement to the bolt cutter, automatic means independent of the cutter positioning means for progressing the cutter from bolt to bolt as they are cut and for keeping the cutter and its actuating means in operative relation.

15. In combination with a cutter, two fluid pressure devices, connections between the cutter and said devices whereby one exerts a relatively continuous pressure upon the cutter and the other imparts a relatively short and forceful movement to the cutter.

16. A machine of the type described including in combination a bolt cutter, means for imparting a quick, forcible cutting movement thereto, a guide along which said cutter and said means progress, and fluid pressure means for so progressing them.

17. In a machine of the type described, the combination with a cylinder, of a cutting head, a stem on the head projecting into the cylinder, a ram in the cylinder adapted on the admission of pressure to strike the cutter stem a forcible blow, a second cylinder flexibly connected with the first, and a piston therein acting to cushion the blow of the ram.

18. In a machine of the type described, the combination with a cutting device and its operating mechanism, of a pressure cylinder, a device adapted to form a flexible connection between the pressure cylinder and a part bearing a fixed relation to the work operated on, a piston in said pressure cylinder, means for subjecting the same to pressure, and a piston rod acting on said flexible connection to subject it to strain.

19. In a machine of the type described, the combination with a cutting device and its operating mechanism, of a pressure cylinder, a chain connected operatively with said cylinder and adapted to be connected also with a part bearing a fixed relation to the work operated on, a piston in said cylinder, means for subjecting the same to pressure, and a piston rod engaging the chain.

20. In a machine of the type described, the combination of a cutting device and its operating mechanism, a pressure cylinder, a chain having operative connection with the cylinder at its forward end, a guide at the rear end of the cylinder around which the chain passes, said chain being adapted to have its free end connected with a part bearing a fixed relation with the work operated on, a piston in said cylinder adapted to be subjected to pressure, and a piston rod engaged with the chain.

21. A portable stay bolt cutter comprising a cutter-actuating cylinder A and a pressure cylinder B connected in fixed relations and adapted to be flexibly suspended from above, a cutting head sustained by cylinder A, means for operating the cutter head to sever the bolts, a flexible connecting means between the cylinders and a part bearing a fixed relation to the work operated on, a piston in the pressure cylinder adapted to be subjected to pressure, and a piston rod bearing on said flexible connecting means.

22. A portable stay bolt cutter comprising a cylinder A and a cylinder B connected in fixed relations one above the other and adapted to be sustained so that they may move forward, a cutter head sustained by cylinder A, means for operating the same to sever the bolts, a chain having one end operatively connected with the cylinders and adapted at its free end to be engaged with a part bearing a fixed relation to the bolt to be severed, a piston in the cylinder B adapted to be subjected to pressure, and a piston rod engaging the chain.

23. A portable stay bolt cutter comprising a guiding rod adapted to be connected with a part bearing a fixed relation to the bolt to be severed, cylinders A and B connected together in fixed relations and mounted on said guiding rod to move thereon, a cutter head sustained by cylinder A, means for operating the same, a piston in cylinder B, means for subjecting the same to pressure, a flexible device operatively connected with the cylinders and adapted to be connected with a part bearing a fixed relation to the bolt to be severed, a piston in the cylinder B, and a piston rod engaging the flexible device.

24. In a machine of the type described, the combination of a cutter-actuating cylinder, a cutter head having a stem mounted slidingly in the front end of the cylinder, a shoulder on the stem outside the cylinder and engaged by the same, a ram movable freely back and forth in the cylinder, means for the admission of pressure behind the ram to propel the same forward to strike the cutter stem, and power means acting on the cylinder and tending to urge the same constantly forward.

25. In a stay bolt cutter, the combination of a cylinder, a cutter head provided with a stem extending rearwardly into the forward end of the cylinder, a ram movable freely back and forth in said cylinder, means for the admission of pressure behind the ram; whereby it will be propelled rapidly forward and deliver a blow to the stem, and means for returning the ram to the rear end of the cylinder for the next blow.

26. In a stay bolt cutter, the combination of a guiding rod adapted to be engaged at its forward end with a part bearing a fixed relation to the bolts to be severed, and movable vertically at its rear end, a cutter actuating cylinder mounted on said rod to move forward, a cutting device sustained by the cylinder and adapted to be thrust forward as the cylinder advances, means for actuating the cutting device, and power actuated means operating on the cylinder and acting to urge the same constantly forward.

27. A machine of the type described including in combination a cylinder, a bolt cutter, a ram movable in the cylinder by fluid pressure to strike the cutter a blow, and automatic means for causing the cutter to travel from one bolt to another of a series as they are severed.

28. A machine of the type described including in combination a cylinder, a bolt cutter, a ram movable in the cylinder by fluid pressure to strike the cutter a blow, and automatic means for causing the cutter and cylinder to travel from one bolt to another of a series as they are severed.

29. A machine of the type described including in combination a cylinder, a bolt cutter, a ram movable in the cylinder by fluid pressure to strike the cutter a blow, and means under the control of the operator for moving the ram to and fro in the cylinder.

In testimony whereof I hereunto set my hand this 13th day of May, 1908, in the presence of two attesting witnesses.

GROVER S. LOWE.

Witnesses:
C. R. ROSBOROUGH,
A. L. WARNER.